(12) United States Patent
Chidlovskii

(10) Patent No.: US 7,035,841 B2
(45) Date of Patent: Apr. 25, 2006

(54) METHOD FOR AUTOMATIC WRAPPER REPAIR

(75) Inventor: Boris Chidlovskii, Meylan (FR)

(73) Assignee: Xerox Corporation, Stamford, CT (US)

( * ) Notice: Subject to any disclaimer, the term of this patent is extended or adjusted under 35 U.S.C. 154(b) by 696 days.

(21) Appl. No.: 10/277,662

(22) Filed: Oct. 21, 2002

(65) Prior Publication Data

US 2004/0015784 A1    Jan. 22, 2004

Related U.S. Application Data

(60) Provisional application No. 60/397,152, filed on Jul. 18, 2002.

(51) Int. Cl.
*G06F 17/30* (2006.01)

(52) U.S. Cl. .................... 707/2; 707/10; 707/104.1; 715/513; 715/530

(58) Field of Classification Search .................... 707/2, 707/3, 4, 103 R, 10, 104.1; 715/513, 530; 702/140, 188; 706/12, 47, 52; 713/500; 714/100, 710, 723; 365/200
See application file for complete search history.

(56) References Cited

U.S. PATENT DOCUMENTS

| | | | | |
|---|---|---|---|---|
| 5,826,258 | A * | 10/1998 | Gupta et al. | 707/4 |
| 5,913,214 | A * | 6/1999 | Madnick et al. | 707/10 |
| 6,009,441 | A * | 12/1999 | Mathieu et al. | 715/516 |
| 6,085,198 | A * | 7/2000 | Skinner et al. | 707/103 R |
| 6,304,870 | B1 * | 10/2001 | Kushmerick et al. | 707/4 |
| 6,424,980 | B1 * | 7/2002 | Iizuka et al. | 715/513 |
| 6,442,749 | B1 * | 8/2002 | Hirao et al. | 717/170 |
| 6,691,264 | B1 * | 2/2004 | Huang | 714/723 |
| 2002/0062312 | A1 * | 5/2002 | Gupta et al. | 707/3 |
| 2004/0015784 | A1 * | 1/2004 | Chidlovskii | 715/530 |

OTHER PUBLICATIONS

Faensen, D. et al., "Hermes—A Notification Service for Digital Libraries", ACM 2001, pp. 373-380.*
Kushmerick, Nicholas "Regression testing for wrapper maintenance", American Association for Artificial Intelligence, 1999, pp. 1-6.*
Kushmerick, Nicholas "Gleaning the Web", IEEE Intelligent Systems, pp. 20-22.*

(Continued)

*Primary Examiner*—Shahid Alam
(74) *Attorney, Agent, or Firm*—Jeannette Walker

(57) ABSTRACT

A method for repairing a wrapper associated with an information source, includes defining a classifier, based on content features of extracted and labeled information using the wrapper, using the classifier to extract content information from the file according to a set of classifier extraction rules; analyzing the extracted content information according to the content features and assigning a label to any extracted content information which satisfies the label's rules; and defining a repaired wrapper as the classifier and those labels in the set which have been assigned to extracted content information. Additional content information and labels can be extracted by iteratively creating a classifier based on both content features and structure features of extracted strings.

11 Claims, 11 Drawing Sheets

OTHER PUBLICATIONS

Stonebraker, Michael et al., "Content Integration for E-Business", ACM SIGMOD, May 21-24, 2001, pp. 552-560.*

Chidlovskii, Boris, System and Method of Automatic Wrapper Grammar Generation, Jul. 6, 1999, U.S. Appl. No. 09/361,496.

Gruser, Jean-Robert, et. al., Wrapper Generation for Web Accessible Data Sources, University of Maryland, College Park Maryland {gruser, louiqa, mvidal, bright} @umiacs.umd.edu.

Kushmerick, Nicholas, Wrapper Induction: Efficiency and expressiveness , Artificial Intelligence 118, 2000 Elsevier Science, pp. 15-68.

Kashmerick, Nicholas, Wrapper Induction, Efficiency and expressiveness (Extended Abstract), School of Computer Applications, Dublin City University, Ireland, 25-37 (nick@compapp.dcu.ie).

\* cited by examiner

FIG. 2

Search Result

Query: title = "collaborative filtering"

| | | |
|---|---|---|
| 1 | EE | Jonathan L. Herlocker, Joseph A. Konstan, Al Borchers, John Riedl: An Algorithmic Framework for Performing Collaborative Filtering. SIGIR 1999: 230-237 [DBLP:conf/sigir/HerlockerKBR99] |
| 2 | EE | Dhruv Gupta, Mark Digiovanni, Hiro Narita, Ken Goldberg: Jester 2.0: Collaborative Filtering to Retrieve Jokes (demonstration abstract). SIGIR 1999: 333 [DBLP:conf/sigir/GuptaDNG99a] |
| 3 | EE | Dhruv Gupta, Mark Digiovanni, Hiro Narita, Ken Goldberg: Jester 2.0: Evaluation of an New Linear Time Collaborative Filtering Algorithm (poster abstract). SIGIR 1999: 291-292 [DBLP:conf/sigir/GuptaDNG99] |

```
<table border=1>
<tr>
<td align="right" bgcolor="#CCCCFF">1</td>
<td bgcolor="CCFFCC"><a href="http://.../p230-herlocker/">EE</a></td>
<td>
<a href="http://..../Herlock:Jonathan_L=.html">Jonathan L. Herlocker</A>,
<a href="http://..../Konstan:Joseph_A=.html">Joseph A. Konstan</A>,
<a href="http://..../Borchers:Al.html">Al Borchers</A>,
<a href="http://..../Riedl:John.html">John Riedl</a>
: An Algorithmic Framework for Performing Collaborative Filtering.
<a href="http://..../sigir99.html#HerlockerKBR99">SIGIR 1999</a>
: 230-237 [DBLP:conf/sigir/HerlockerKBR99]
</td></tr>
```

*FIG. 3*

Search Results for 'collaborative filtering'

- Jonathan L. Herlocker, Joseph A. Konstan, Al Borchers, John Riedl: An Algorithmic Framework for Performing Collaborative Filtering. SIGIR 1999: 230-237
- Dhruv Gupta, Mark Digiovanni, Hiro Narita, Ken Goldberg: Jester 2.0: Collaborative Filtering to Retrieve Jokes (demonstration abstract). SIGIR 1999: 333
- Dhruv Gupta, Mark Digiovanni, Hiro Narita, Ken Goldberg: Jester 2.0: Evaluation of an New Linear Time Collaborative Filtering Algorithm (poster abstract). SIGIR 1999: 291-292

*FIG. 4*

- Jonathan L. Herlocker, Joseph A. Konstan, Al Borchers, John Riedl: An Algorithmic Framework for Performing Collaborative Filtering. SIGIR 1999: 230-237
- Dhruv Gupta, Mark Digiovanni, Hiro Narita, Ken Goldberg: Jester 2.0: Collaborative Filtering to Retrieve Jokes (demonstration abstract). SIGIR 1999: 333

| Position | String | Label | $F^S$ | | | |
|---|---|---|---|---|---|---|
| | | | none | number | ee | author |
| ... | | | | | | |
| 34 | 2 | number | 7 | 10 | 9 | 4 |
| 35 | EE | ee | 8 | 1 | 10 | 5 |
| 36 | Dhruv Gupta | author | 9 | 2 | 1 | 6 |
| 37 | , | none | 10 | 3 | 2 | 1 |
| 38 | Mark Digiovanni | author | 1 | 4 | 3 | 2 |
| ... | | | | | | |

FIG. 8
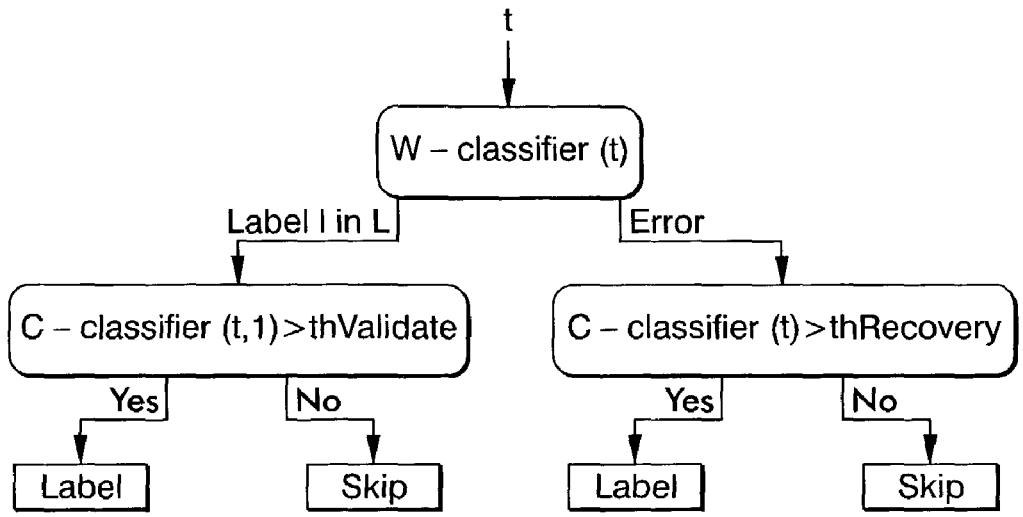
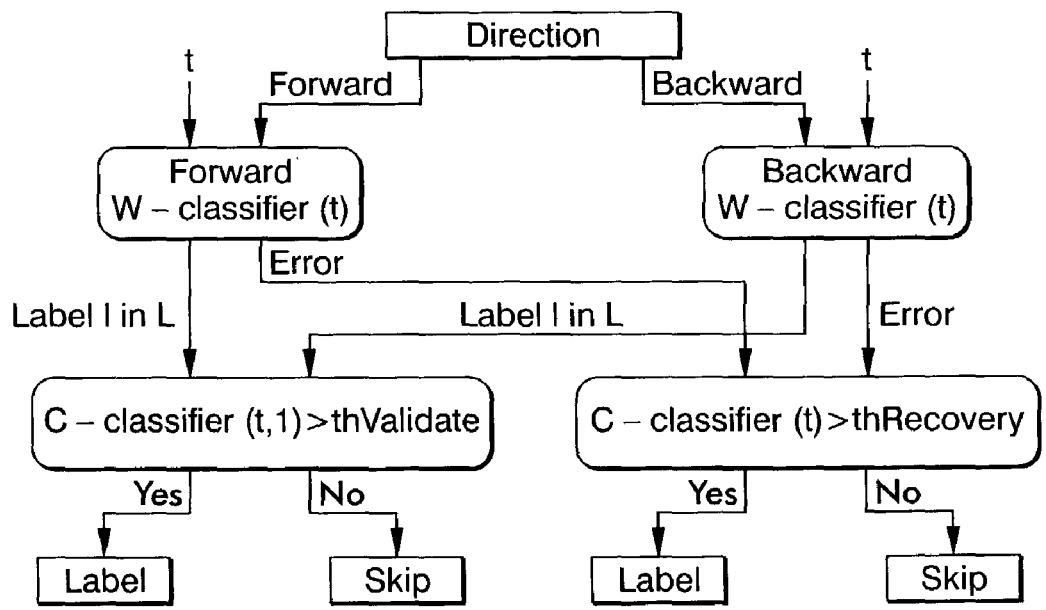
FIG. 9

METHOD FOR AUTOMATIC WRAPPER REPAIR

CROSS-REFERENCE TO RELATED APPLICATIONS

This application claims priority from provisional application No. 60/397,152 filed Jul. 18, 2002, which is incorporated herein by reference. This invention is related to co-assigned, copending U.S. application Ser. No. 09/361,496 filed Jul. 26, 1999 for "System and Method for Automatic Wrapper Grammar Generation", which is incorporated herein by reference.

FIELD OF THE INVENTION

This invention relates generally to wrappers, and more particularly to a method for automatic repair of wrappers.

BACKGROUND OF THE INVENTION

A wrapper is a type of software component or interface that is tied to data which encapsulates and hides the intricacies of an information source in accordance with a set of rules. Wrappers are associated with the particular information source and its associated data type. For example, HTTP wrappers interact with HTTP servers and HTML documents; JDBC wrappers work with ODBC-compliant databases; and DMA wrappers work with DMA-compliant document management systems.

The World Wide Web (Web) represents a rich source of information in various domains of human activities and integrating Web data into various user applications has become a common practice. These applications use wrappers to encapsulate access to Web information sources and to allow the applications to query the sources like a database. Wrappers fetch HTML pages, static or ones generated dynamically upon user requests, extract relevant information and deliver it to the application, often in XML format. Web wrappers include a set of extraction rules that instruct an HTML parser how to extract and label content of a web page. These extraction rules are specific for a given Web provider and therefore may be tightly linked to the layout and structure of the provider pages.

When a wrapper is generated, it is assumed that the layout and structure of the document pages do not change. However, Web page owners frequently update and revise their pages, which often involves changing the layout and structure of their pages. Wrappers become brittle when the page mark-up or layout or structure is changed. When the wrapper is brittle, the wrapper may fail to find specific "landmarks" in the page and may fail to apply the corresponding extraction rules, thus becoming inoperable and incapable of completing the task of information extraction. When the wrapper is broken, it must be repaired. However, users find that it is often easier to relearn or regenerate a broken wrapper than to repair it. However, relearning requires user intervention that is not always available. Moreover, a regenerated wrapper is not scalable if changes occur frequently.

Wrapper maintenance is challenging when provider pages undergo massive and sweeping modifications, due to, for example, a complete site re-design. A re-designed site will usually require regenerating the wrapper. However, most changes to Web pages are small and localized in nature, including small changes in the page mark-up, small changes in the content information, and possibly the addition or deletion of a label. It would be desirable to have a method of generating a wrapper with integrated maintenance components capable of recovering, automatically when possible, from small changes.

One solution to the problem of wrapper maintenance detects page changes within a defined level of accuracy. When the change is detected, the designer is notified so that the wrapper can be regenerated from samples of the changed pages. This solution requires user intervention. Another solution for wrapper repair finds the most frequent patterns (such as starting or ending words) in the content of labeled strings and then searches for these patterns in a page when the wrapper is broken. It would be desirable to have a method for wrapper repairing that accurately and automatically repairs wrappers in a large number of situations.

SUMMARY OF THE INVENTION

A method for repairing a wrapper associated with an information source, according to one aspect of the invention, wherein an initial wrapper comprises an initial set of rules for extracting information and for assigning labels from a wrapper set of labels to the extracted information, includes defining a classifier comprising a set of alternative rules for extracting information and for assigning labels to the extracted information; providing a file from the information source after the information source has changed its file format; using the classifier to extract information from the file and to assign a label to any extracted information which satisfies the label's definition; and constructing a repaired wrapper comprising those alternative rules for which corresponding labels have been assigned to information extracted by the classifier. While the initial wrapper may be broken, parts of the initial wrapper may still work. The method of repair may also include using the initial wrapper to extract information from the file and to assign a label from the set of wrapper labels to any extracted information which satisfies the label's definition; and constructing a repaired wrapper comprising those initial rules for which corresponding labels have been assigned to information extracted by the wrapper and those alternative rules for which corresponding labels which have been assigned to information extracted by the classifier.

In the case of a web wrapper, the initial set of rules is typically a set of grammar/transducer rules tuned to parsing files from the beginning of the file to the end of the file. The set of alternative rules may, for example, be based on content features of information extracted by the initial wrapper from files produced by the information source before it changed its file format; or context features of information extracted by the initial wrapper from files produced by the information source before it changed its file format; or structure features of information extracted by the initial wrapper from files produced by the information source before it changed its file format; or the initial set of rules applied in a direction opposite to the direction in which the initial wrapper applied them. Examples of content features include syntactic features and semantic features; examples of syntactic features include length of a string, number of separators between strings, and number of words in a string. Examples of semantic features include number of nouns, data strings, and numeric strings. Structure features represent relative co-occurrence of extracted and labeled content information in the file.

A method for repairing a wrapper associated with an information source, wherein the wrapper comprises a first set of rules for extracting information and for assigning labels from a set of wrapper labels to extracted information, according to another aspect of the invention, includes defining a first classifier, based on a content feature set of extracted and labeled information using the first set of rules, for extracting information and for assigning wrapper labels to the extracted information; providing a Web page from the information source; using the first classifier to extract information from the Web page and to assign a first one of the wrapper labels to any extracted information which satisfies the label's definition; defining a second classifier, based on the content feature set and a structure feature set of the one assigned wrapper label, for extracting information and for assigning wrapper labels to the extracted information; using the second classifier to extract information from the Web page and to assign a second one of the wrapper labels to any extracted information which satisfies the second label's definition; and defining a repaired wrapper as the second classifier and the two labels in the set which have been assigned to the extracted information. This method may be extended by defining a third classifier to identify a information in the Web page and to assign a third one of the wrapper labels to the extracted information which satisfy the third label's rules; and defining the repaired wrapper as the third classifier and the three labels in the set which have been assigned to extracted information.

Wrapper repair depends, to a large extent, on how much information can be extracted from the file using the broken wrapper. It would be desirable to keep those portions of the original wrapper that still extract information correctly. A method of information extraction from a Web page using an initial wrapper which has become partially inoperative, according to another aspect of the invention, wherein the initial wrapper comprises an initial set of rules for extracting information and for assigning labels from a wrapper set of labels to the extracted information, includes using the initial set of rules to extract information in the form of strings from the Web page parsed in a first (forward) direction; analyzing the extracted strings according to the initial set of rules for assigning labels associated with the wrapper; assigning labels to those strings which satisfy the label rules; using the initial set of rules to extract strings from the Web page parsed in a second (backward) direction; analyzing the extracted strings according to the set of rules for assigning labels associated with the wrappers; and assigning labels to those unlabeled strings from which satisfy the label rules. The method may further include classifying the extracted strings based on content features of the labeled extracted strings from the forward direction; and validating those labeled extracted strings which satisfy the label rules within some first threshold value.

The method of information extraction can be used to build alternative and redundant views of provider pages, using content features of extracted information. Conventional wrappers may be combined with alternative classifiers in order to achieve two important goals. First, the alternative content-based classifiers help validate information extracted by a transducer-based wrapper. Second, when the transducer based wrapper fails to extract information, the alternative classifier is used to resume the information extraction. Within a given accuracy threshold, the wrapper detects if it can repair the wrapper itself or if it should be sent to a designer for manual repair.

BRIEF DESCRIPTION OF THE DRAWINGS

FIG. 2 is a sample answer produced by a wrapper for the DBLP web site;

FIG. 3 is the corresponding HTML source for the answer shown in FIG. 2;

FIG. 4 is the sample answer produced by a wrapper for the DBLP web site after the web site was changed;

FIG. 5 illustrates repairing information extraction from the sample of FIG. 4;

FIG. 6 shows a fragment of extraction from the DBLP sample and setting values for some structural features;

FIG. 8 illustrates recovery with two classifiers in algorithm 3;

FIG. 9 illustrates recovery with forward and backward T-content classifiers.

DETAILED DESCRIPTION OF THE EMBODIMENTS

The system and method of the invention is applicable to the automatic repair of any type of wrapper. For convenience, the following discussion will focus on exemplary wrappers used to extract information from Web pages.

Web pages that contain relevant information vary in complexity and organization. They can be static like a CNN news page or dynamic like pages generated by a search engine in response to a user request. They can contain advertisements which change at the download time; they can be well-formatted (XHTML) or not. Wrappers that extract information from Web pages may be developed using a variety of different wrapping techniques. For example, a particular Web wrapper might target the extraction of one tuple from a page, such as a book price or a weather forecast, where another wrapper might target lists of nested tuples with multiple labels.

Three exemplary types of format changes that may occur in a Web page include: context shift, content shift and structural shift. A context shift is a change in the page mark-up; such as, for example putting price values in boldface or adding home page links to authors' names. A context shift does not change the extracted information. A content shift is a change in content of information extracted by the wrapper. Examples include replacing abbreviations used for a conference ("SIGIR") with their full title ("ACM Conference on Research and Development in Information Retrieval") or adding the prefix "pp." to page strings. A structural shift is a change in the structure of extracted information. Examples include the addition of new labels, removal of old ones, order permutations, etc.

Figure 1:
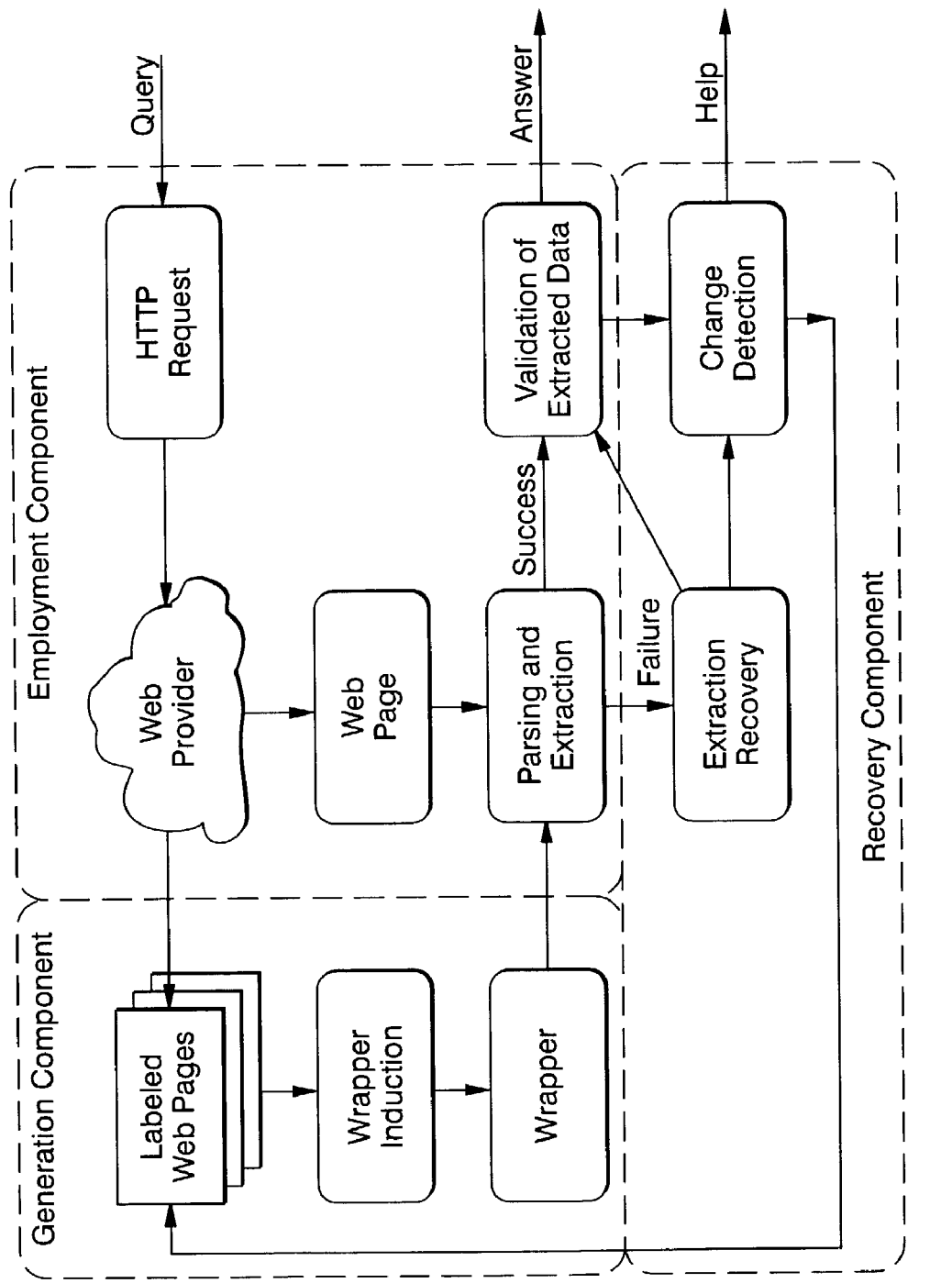
FIG. 1 is a block diagram of an architecture for wrapper generation and maintenance.

Referring to FIG. 1, a block diagram of wrapper architecture includes a wrapper Generation component, a wrapper Employment component and a wrapper Recovery component. The Generation component generates or creates a wrapper 16 for a particular Web provider 10. A wrapper may be generated using one of various techniques, including those techniques which use an induction method. In an induction technique, several labeled sample HTML pages 12 from Web provider 10 are provided to wrapper induction engine 14. The wrapper induction engine 14 generalizes the labeled pages into a wrapper 16. Wrapper 16 may then be used in the Employment component to process any new HTML page 18 (which is generated by provider 10 in response to HTTP request 30 for a user, for example) from the provider 10. All information successfully extracted (by parsing and extraction 20) by the wrapper 16 from HTML page 18, is verified in validation of extracted data 22 and the answer provided.

When Web provider 10 changes the format of a Web page, the wrapper 16 may be unable to match some strings to extraction rules. The wrapper runs in an error and triggers the recovery component which attempts to resume the information extraction and repair the wrapper. Two sequential maintenance steps are distinguished: extraction recovery and wrapper repairing. Extraction recovery targets the identification of labeled strings in the page; it is aimed at extracting as much relevant data as possible, yet it does not necessarily lead to wrapper repair. Wrapper repair may be accomplished if the extraction recovery is sufficiently successfully. Pages in the new format can be automatically re-labeled and extraction rules can be consistently re-learned to match the new page format. If the extraction recovery is not sufficiently successful or sufficiently complete, the wrapper may not be repaired automatically and user intervention may be required.

If the provider 10 changes the format of its HTML pages, and the wrapper 16 fails to complete parsing and information extraction, the web page 18 is provided to extraction recovery 26. Extraction recovery 26 uses one or more of the methods described herein and tries to extract as much information as possible from the page 18. A successful recovery is sent to validation of extracted data 22. Any changes detected are provided to change detection 28, which results in automatic re-labeling of new samples that can then be used to generate a new wrapper (or repair the old wrapper) that accommodates the new page format.

Information extraction from HTML pages can be considered a form of transduction, where input strings over alphabet A are transduced in output strings over alphabet L. Analogizing information extraction to transduction reduces wrapper learning to transducer learning using the advanced techniques created by the grammatical inference community. These techniques are used in the method of automatic wrapper maintenance and are described generally below.

A regular transducer T: $A^* \rightarrow B^*$ is an finite-state automaton when any transition consumes one input token $a \epsilon A$ and emits one or more output symbols $b \epsilon B$. Input strings accepted by regular transducers form a regular set, denoted Dom. The most significant feature of regular transducers is that they can be learned from positive examples. When transducers are applied to wrapping HTML pages, the input strings are tokenized into a sequence of textual and tag tokens, t, where $t \epsilon A$. Textual tokens comprise the page content and are denoted as text, where $text \epsilon A$; tag tokens control the content visualization. Most wrappers target the extraction of textual tokens and components of some tag tokens, for example, href attribute of <a>, <img> tags. In labeled samples, only these tokens may have semantic labels, while all non-extracted tokens are assumed to be labeled with a special none label, where $none \epsilon L$. Semantic labels l in set L are also seen as classification classes. Classifying a token $t \epsilon A$ into class $l$ c L is denoted l(t) and the result of transduction of input string $x \epsilon Dom$ is denoted T(x).

When processing an input HTML page, the wrapper analyses the element contents with their HTML context to classify them into one of the classes. When a wrapper is broken, the HTML context of strings cannot be used any longer. The automatic wrapper repair method and system uses other features to build a classifier for content strings.

The wrapping of HTML pages may be considered as a special case of a classification problem. A conventional wrapper can be seen as a classifier where each class/label (including the special label none for non-extracted strings) is characterized by a set of rules having a grammatical nature and using HTML context (tags). Any element of content in input data is labeled with a class l from a set L of classification labels. Consider two disjoint feature sets for input data, context features and content features for pages in questions. A context feature of a content string in HTML characterizes its surroundings, that is, the tag and textual tokens that precede (prefix) or follow the string (suffix). A content feature characterizes the string itself, the string length or number of words in it are examples of content features. Though there might exist certain correlations between particular tags and content, for example, a page title is often surrounded by HTML tags <h1> or <h2>, the two sets of features are considered to be uncorrelated.

Content, context and structure features may be used to build a number of independent classifiers. Classifiers built with context features are extraction rules used by various wrapper induction methods; they classify content strings by their context, that is, by observing tags and other strings around the fragments. Classifiers built with content features classify strings of a file by analyzing their content. Multiple classifiers are used to recover information extraction when a wrapper runs in error. Having a number of alternative classifiers is beneficial in the case of concept shift. Small changes in page format often hurt some of the classifiers, but not all of them. Therefore, it is possible to use valid classifiers to identify reliable components in input data and reuse them to automatically re-learn the wrapper.

The set of features used for the wrapper repairing classifier include content, context and structure features. Content features reflect the content of extracted and labeled information; these features are both primitive (syntactic) ones like the length, the number of separators; and more advanced (semantic) ones, likely number of nouns or date strings. Structural features are a complement to content ones; they express the mutual co-allocation of strings in the page marked with different labels.

A set of content features for the HTML string classification is identified for a particular wrapper. The content feature set $F_C$ includes syntactic and semantic features. Syntactic features may be the length, word counts, density of digits, upper-case and lower-case characters and standard delimiters (comma, semicolon, blank, dot, etc., dash) and some others. For finding semantic features, simple linguistic tools, such as finding of typed tokens (proper names, abbreviations, url/date/time strings, etc.), noun phrases, etc. may be used.

Wrapper example 1: Consider a wrapper for a Database and Logic Programming site (DBLP) (http://www.informatik.uni-trier.de/~ley/db/index.html) that provides bibliographic information on computer science publications. A sample answer produced by the wrapper for the DBLP site is shown in FIG. 2 and its corresponding HTML source is shown in FIG. 3. In February 2001, the page layout used for answers to title-relevant queries underwent some changes. The sample after the change is shown in FIG. 4. Each answer item on the original page (FIG. 2) contains a number, title, one or more authors, conference, pages, reference and (possibly) a hyper-link to the electronic edition. The information extraction conducted by the DBLP wrapper consists of labeling all textual tokens (PCDATA) in a page with one of labels in L={number, ee, author, title, conference, pages, none}. An example of extraction for the first item is (number="1", ee="http://www.informatik.uni-trier.de/ . . . ", author="Jonathan L. Herlocker, Joseph . . . ", title="An Algorithmic . . . ", conference="SIGIR 1999", pages="230–237", reference="DBLP:conf/sigif/HerlockerKB1999"). The layout change results in the disappearance of the number, electronic version and reference and change in the reference format.

A classifier built from simple content features is rarely 100% accurate; often only some strings can be correctly identified with high accuracy. In the DBLP sample, only comma separators between authors (labeled with none) are accurately identified from content features. In FIG. 5 these separators are marked with blocks; for all other strings, the (decision tree) classifier gives 68% to 92% of prediction accuracy which is insufficient for a reliable repairing of information extraction.

Figure 7:
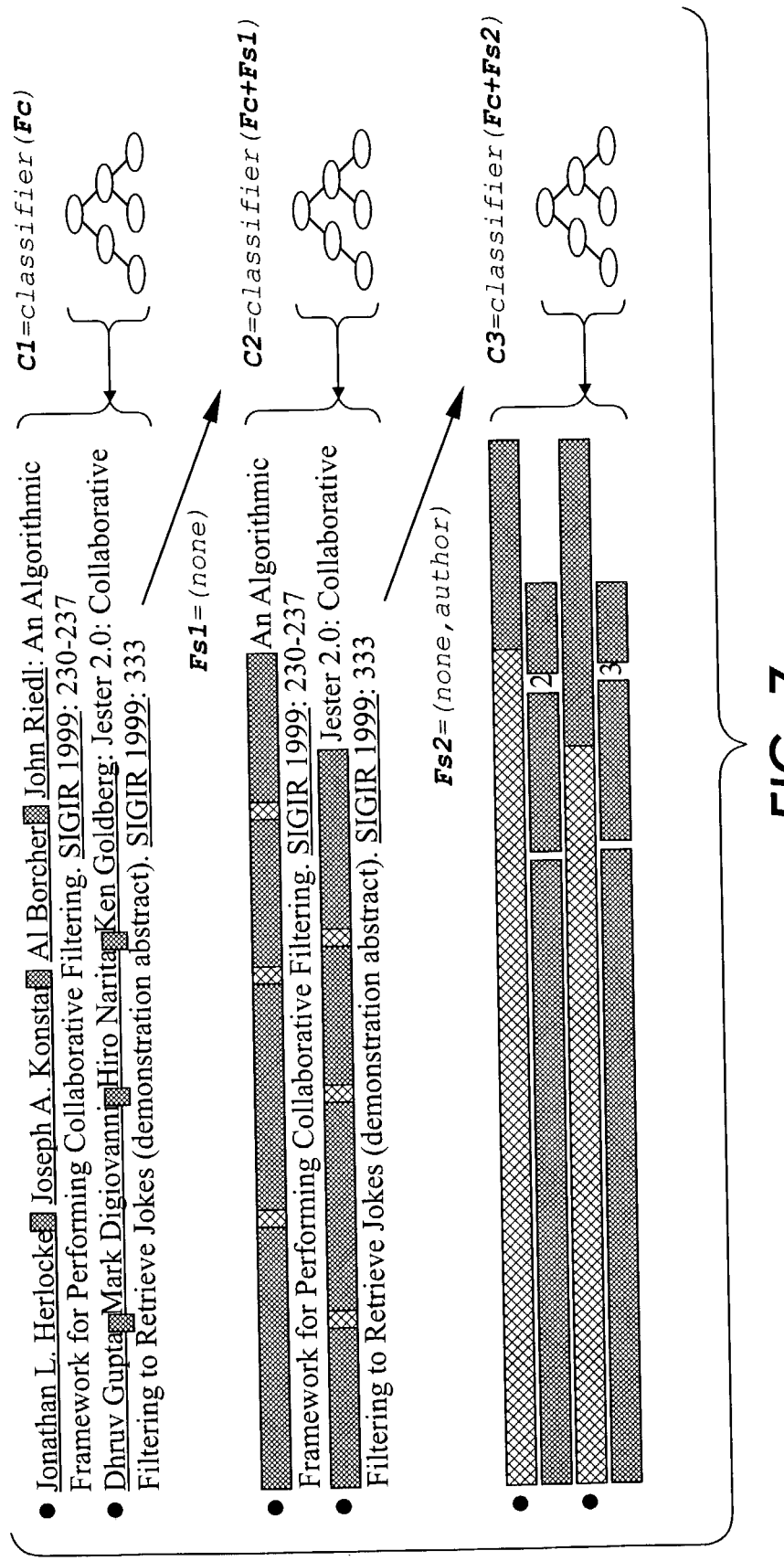
FIG. 7 illustrates iterative repair of the wrapper for the DBLP web site.

In the method of wrapper repair, content features are extended with structural features. The number of structural features for a given wrapper W equals to the number of wrapper labels, including none, $F_S(l_j)$, $l_j \in L$. Assume a wrapper processes strings in an HTML page and labels a string t in position i with a label $l_j \in L$. Then, the structure feature $F_S(l_j)$ is set to $|i-p_j|$, where $p_j$ is the position of the last token extracted with label $l_j$. By construction, the structural features take positive integer values. FIG. 7 shows a fragment of extraction from the DBLP sample page and setting values of some structure features (namely, $F_S$ (none), $F_S$ (ee), $F_S$ (number), $F_S$ (author)) for the DBLP label set.

When structure features are used together with content features for the string classification, the classification error level is much lower than the classification by content features only. This allows us to repair the information extraction for a given wrapper with much higher accuracy. However structural features considerably improve the classification accuracy when most strings are already correctly labeled. To solve this chicken-and-egg problem, we use the basic classifier $C_1$ on content feature set $F_C$ for bootstrapping of the wrapper repair process. Then, structure features for all labels detected by the basic classifier are combined with the content features to build a new, more refined classifier $C_2$. The process iterates, each time with a larger set of structure features enhancing the content features, until no new string can be labeled.

The example in FIG. 5 shows how the bootstrapping works in the DBLP wrapper case. The basic classifier $C_1$ identifies (some) none strings in the DBLP page. Thus the system builds a new classifier $C_2$ built for $F_C + F_{S1}$, where $F_{S1}$ is the structure feature for none label; applying $C_2$ to the file reduces the error ratio and the new classifier can accurately identify author strings in the page. On the next step, a new classifier $C_3$ is built for the feature set $F_C + F_{S2}$, where $F_{S2} = \{F_S \text{ (none)}, F_S \text{ (author)}\}$. Then, this classifier allows us to identify title and conference labels. In FIG. 5, dark strips cover newly labeled strings are while light strips cover previously labeled strings.

Wrapper example 2 (DBLP Wrapper is an OCER wrapper). In regular transducers, consuming an input token does not necessarily lead to emitting an output symbol. The representation of complex regular patterns may face multiple output choices in some transducer states; in which cases the output is postponed until reaching a state where the ambiguity is resolved. In 1993, Oncina et al., in Learning subsequential transducers for pattern recognition interpretation, *IEEE Trans. on Pattern Analysis*, 15:448–458, proposed the OSTI algorithm that allows inference of regular transducers from positive samples and minimizes the delays between input token consumption and output emission for all ambiguity cases in the result transducer.

Boris Chidlovskii, in Wrapping Web Information Providers by Transducer Induction, *Proc. Europ. Conf. Machine Learning, Germany, Freiburg*, volume 2167 of *Lect. Notes Comp. Sci.*, pages 61–72. Springer, 2001, describes a method that applies the transducer induction of the OSTI algorithm to the conventional representation of wrappers as sets of extraction rules. The method is called the *Optimal Context Extraction Rules* (OCER); it is an incremental version of the OSTI algorithm and it adopts the regular transduction to the information extraction task. In the OCER method, labeled and unlabeled HTML fragments are denoted: the class of unlabeled fragments is denoted $S^u$, where $S^u = \{v | xv \in Dom\}$ and the class of labeled HTML fragments is denoted $S^l\{x, T(x)) | uxv \in Dom$ for some u and v$\}$.

Definition 1 An OCER wrapper W is a triple (T, L, R), where T is an input tokenizer, L is the semantic label set and R is a set of extraction rules $R = \{r_i\}$, where each rule $r_1$ is a triple (p,s,l), where $p \in S^l$ and $s \in S^u$ are prefix and suffix, and $l \in L$.

An OCER wrapper W parses a page E from the beginning to the end and applies the extraction rules in R as follows. For a current textual token t, the labeled prefix P of t contains all tokens from the beginning until t, with all previous textual tokens labeled, and S is suffix of t, E=PtS, $P \in S^l$, $S \in S^u$. Pair (P,S) forms the full context of token t. The wrapper then compares P and S to prefixes and suffixes in the extraction rules. Pair (P,S) matches a prefix-suffix pair (p,s) of a rule r=(p,s,l), if p is a suffix of P, P=up, and s is a prefix of S, S=sv, for some labeled u and unlabeled v. In the match is found, string t is labeled with label l in the rule. If no exact rule is found for P and S, the wrapper results in an error.

A prefix-suffix pair in an extraction rule $r \in R$ forms its context. A method for detecting optimal and minimal prefix-suffix pairs for extraction rules is described in Chidlovskii, Wrapping Web Information Providers by Transducer Induction. Like the OSTI algorithm, the OCER method finds all ambiguities in sample data and detects minimal delays between an input token consumption and classification. In addition, the OCER is incremental; it aligns an input token consumption with the classification. It replaces emission delays with corresponding lookaheads in the input data; these lookaheads are given by suffixes in rules. Finally, OCER method disregards variations in input that are irrelevant to the result information extraction. For the majority of Web providers, the input data does fit the class of regular languages, thus allowing to infer regular transducers, and therefore OCER wrappers, from positive examples.

In an OCER wrapper, the classification label of a textual token may depend on labels of previous textual tokens. Prefix <td> for label ee in the DBLP wrapper is label-independent; so any textual token preceded with tag <td> will be labeled as ee. Instead, two prefixes "author</a>" (an abbreviation of the HTML fragment "text(author)</a>(none)") for title and "conference</a>" for pages are label-dependent. If tag </a> precedes a current textual token, then it will be labeled as title if the previous textual token is author and as pages if the previous token is conference.

The DBLP wrapper in this example contains 12 extraction rules, which are listed in Table 1. The left side of the table identifies the rules before any changes. Rules are grouped by classification labels. All rules, except $r_{12}$, have the empty suffix, which means that the processing of token prefixes is enough in most cases. The right side of Table 1 shows the effect of the changes.

TABLE 1

Extraction rules in DBLP wrapper; before and after change

| Rule | Prefix | Suffix | Label | After Change |
|---|---|---|---|---|
| $r_1$ | <title> | | none | |
| $r_2$ | <hi> | | none | |
| $r_3$ | <hr> | | none | |
| $r_4$ | </a> | | none | |
| $r_5$ | <tr><td> | | number | disappears |
| $r_6$ | <td><a> | | ee | disappears |
| $r_7$ | number<td> | | ee | disappears |
| $r_8$ | ee<td><a> | | author | changes to (<li><a>, , author) |
| $r_9$ | none<a> | | author | |
| $r_{10}$ | author</a> | | title | |
| $r_{11}$ | title<a> | | conference | |
| $r_{12}$ | conference</a> | <li> | pages | |

All rules in Table 1 are deterministic and no two rules may have the same context. All contexts are minimal and optimal; shortening any context would make the rule set R ambiguous. The sum of prefix and suffix lengths in a rule gives a context width. For the DBLP wrapper, the maximal content width equals 3; in more complex cases, the maximal context might be wider. In general, the class of OCER wrappers have a high expressive power, as using both labeled prefixes and unlabeled suffixes allows coping with many ambiguous cases by observing the unlabeled prefixes only.

The minimality of extraction rules does not guarantee wrapper uniqueness. In certain cases, several alternative OCER wrappers may exit for a provider. In the DBLP wrapper example, an extraction rule $r_{12}$=(conference</a>, <li>, pages) can be replaced with an alternative rule $r_{12}$=(</a>, <li>text, pages), which means that any string which is preceded with </a> tag and followed with "<i> text" is labeled as pages.

The DBLP sample page after the change is shown in FIG. 4. The format change concerns both page mark-up and structure. The mark-up change is in replacing the <table> element containing <td> sub-elements with an <ul>-list where items are separated by <li> tags. The structure change takes place because of the disappearance of all information labeled number and ee. As for the extraction rules (see Table 1, right part), not only rules for number and ee disappear, but one of two rules for author changes, too. The only rule for author that does not change, $r_9$ refers to the extraction of second, third, etc. authors of a given paper. Note that textual tokens labeled as none and preceding all authors but the first one, are comma's separating authors; see FIG. 3. The rule for these later tokens (labeled as none) does not change either.

A transducer wrapper is considered a partial classifier, where each label, including none, is characterized by a set of associated extraction rules (see Table 1). When processing a page, the wrapper analyzes a current token's context to correctly classify the token. This context-based classifier is partial, so it runs in an error when no exact rule is found.

When a wrapper cannot label a token, an initial recovery strategy is to skip one or more textual tokens in the input until the first token that does match some rule. Note that skipping strings is different from labeling them with none. If a string t is preceded with one or more skipped strings, then the prefix of t cannot match any of label-dependent rules. Therefore, the recovery will skip strings until a label-independent rule is matched.

In Algorithm 1 below, wrapper W processes a current textual token t and W(t) is either a label $l_w \in L$ if it finds a matching rule or an "error", otherwise.

Algorithm 1. Information Extraction with Initial Recovery.

```
E:= HTML page; success:= true
for each string t in E do
    L = W(t)
    if l ∈ L then
        label t with $l_w$
    else skip t; success:= false
return success
```

In the DBLP case (see FIG. 4 for the sample page after the change), the wrapper runs into an error at text token for the first author (Jonathan L. Herlocker) of the first item, because its prefix ". . . <li><a>" does not match any extraction rule in Table 1. Using the initial recovery routine, the wrapper will skip the first author, then it will analyze and label the following "," (comma) token as none, because it fits the label-independent prefix </a> in rule $r_4$. Extraction then resumes and all following authors, title, conference and pages with be extracted in a regular way. A new error will occur again at the beginning of the next answer item, and so on.

In the general case, the majority of wrapper rules may have label-dependent prefixes and the recovery by skipping tokens till one that matches a label-independent rule may be too generous. To solve the problem, the unique so far context-based classifier is extended with alternative views which can be used during the information extraction recovery.

Backward wrappers: The initial recovery routine helps wrappers resume information extraction. To further improve the accuracy of extraction recovery, an alternative view of pages in questions may be used, namely backward wrappers. In contrast to forward wrappers, backward wrappers scan HTML files from the end to the beginning.

A backward OCER wrapper scans a file backward and has the same structure as the forward one; its extraction rules however use optimal and minimal set of labeled suffices and unlabeled prefixes to uniquely label textual tokens. Like forward wrappers, a backward wrapper is partial and can run in error when the format changes. However, because of the backward scanning, it would fail at positions different from those where the forward wrapper would fail. Therefore, backward extraction rules can help to complete information extraction in positions where the forward wrapper fails.

The joint use of forward and backward wrappers in combination transforms the recovery procedure from one-pass scan into multi-pass one; moreover during the recovery the direction of the file scan can change one or more times. In the following, forward and backward wrappers are denoted as $W^{fwrd}$ and $W^{bdwd}$, respectively.

Algorithm 2 below completes the information extraction and recovery performed by Algorithm 1. Algorithm 2 runs when Algorithm 1 returns false and fails to accurately complete the information extraction. Algorithm 2 switches the file scan direction and tries to classify not yet classified textual tokens in E probing their prefixes and suffixes with forward and backward wrappers, respectively. Algorithm stops when none of the tokens is classified during the last scan.

Algorithm 2. Multi-scan Recovery with Forward and Backward Wrappers.

```
success:= false
stillRecovery:= true; direction:= 'bkwd'
while stillRecovery is true do
    stillRecovery:= false
    for each unlabeled string t in E do
        l_w := W^direction (t)
        if l_w ∈ L and then
            label t with l_w; stillRecovery:= true
        else skip t; success:= false
    if stillRecovery is true then change direction
return success
```

Content classifiers: In this section, token classification by content features only are considered. Select a set $F_C$ of k=54 content features for the alternative classifier, these features consist of 42 syntactic and 12 semantic ones. Syntactic features include token length, word counts, density of digits, upper-case and lower-case characters and standard delimiters (comma, semicolon, dot, etc.). Semantic features count typed components of textual tokens, such as proper names, abbreviations, url and time strings and noun phrases.

Content classifier C is generated from the content feature set $F_C$ of textual tokens in sample pages. Any existing techniques for classifier generation can be used here; we use decision trees from Borgelt's publicly available package. Assume that for textual token t, classifier C returns a pair $C(t)=(l_c, acc)$ where $l_c$ is the most probable label for t, $l_c \in L$ and acc is the accuracy for $l_c$. Similarly, C(t,l) returns the accuracy of labeling token t with l. For perfect rules, C(t,l) returns acc=1.0.

It is now straightforward to extend the initial recovery strategy described above with a content classifier. First, the content classifier C can validate information the wrapper extracts in the regular way. Second, when a wrapper runs into errors, the combined information extraction recovery will not simply skip tokens with unrecognized context, but will apply the corresponding content classifier in order to label such tokens.

Algorithm 3 below scans page E from the beginning to the end. First it probes a basic (forward) wrapper W with a current token t; if W finds a matching rule with label $l_w$, t is labeled with $l_w$ if C validates $l_w$ by observing content features of t, for some threshold validation value, that is, C(t, $l_w$)≧thValidate. If an error occurs, C provides the most probable label $l_c$ for t. If the accuracy of $l_c$ is superior to a given threshold value, thRecovery, t is labeled with $l_c$, otherwise string t remains unlabeled. Note that, like Algorithm 1, Algorithm 3 scans the file only once.

Algorithm 3. Information Extraction with Initial and Content Recovery.

```
thRecovery:= recovery threshold
thValidate:= validation threshold
P:= HTML page; success:= true
for each string t in P do
    l_w = W(t)
    if l_w ∈ L and C(t,l_w) ≧ thValidate then
        label t with l_w
```

-continued

```
    if l_w is 'error' then
        l_c, acc = C(t)
        if acc ≧ thRecovery then label t with l_c
        else skip t; success:= false
    else skip t; success:= false
return success
```

The content classifier C plays a double role in the extraction and recovery routine. First, it validates labels for strings found by extraction rules. Second, C provides a candidate label for a string when the wrapper runs in an error. This double role confirms the use of two threshold parameters in Algorithm 1. The validation threshold thValidate confirms the label choice done by the wrapper, and therefore it is lower that recovery threshold thRecovery in cases when the wrapper runs in error and labeling decision is made only by the content classifier, thValidate<thRecovery. Algorithm 3 is a sequential combination of two alternative views of input data, given by an OCER wrapper (W-classifier) and content (C-) classifier. This combination is schematically represented in FIG. 8.

Algorithm 4 below completes Algorithm 3 with backward wrappers and multi-scan recovery in the same way as Algorithm 2 completed Algorithm 1. Algorithm 4 runs when Algorithm 3 returns false and fails to accurately complete the information extraction. Algorithm 4 switches the file scan direction and tries to label not yet labeled textual tokens probing their context with forward and backward wrappers and content classifiers. Algorithm stops when none of the tokens is labeled during the last scan. Schematically, the combination of these three classifiers is presented in FIG. 9.

Algorithm 4. IE Multi-scan Recovery with Forward and Backward Wrappers.

```
success:= false
stillRecovery:= true; direction:= 'bkwd'
while stillRecovery is true do
    stillRecovery := false
    for each unlabeled string t in E do
        l_w: = W^direction (t)
        if l_w ∈ L and C(t, l_w) ≧ thValidate then
            label t with l_w; stillRecovery:= true
        else skip t; success:= false
    if stillRecovery is true then change direction
return success
```

Wrapper Repairing. The information extraction recovery is triggered by wrapper errors on a changed page; it applies Algorithm 1(3) and possibly Algorithm 2(4) to accurately label tokens in the page using alternative content classifiers and backward wrappers. In turn, the information extraction recovery triggers wrapper repair if the recovery went sufficiently well and all strings have been labeled with a given threshold of accuracy. It can then automatically re-label sample pages and use them as input to the automatic re-learning of the grammatical classifier, by using any of existing methods for wrapper induction. If instead the recovery is incomplete and some strings in the page remained unlabeled, no trusted samples can be prepared for automatic re-learning and therefore the wrapper repairing cannot be successful.

Experiments have been conducted to validate three recovery mechanisms described above. Seventeen (17) Web information providers were selected for the experiments; for any of them, at least one format change has been detected during the period from July 1999 to October 2001. For the sake of comparison, the providers are divided into three groups. Two first groups are general-purpose and specialized (in computer science) search engines. The first group includes Altavista, Google, Excite, Yahoo, Metasearcher, Go, Deja and CNN search engines. The second group includes DBLP, ACM, IEEE, Elsevier and Cora search facilities. Wrappers in the two groups extract "multi-slot multi-value" information, that is, the result is a list of items and each item contains a number of ( value, label) pairs. Instead, the third group contains wrappers performing the "one-item multi-slot" information extraction, such as the stock information from Wall Street and Financial Times cites and book information/prices from Amazon.com.

Context and content classifiers. For all providers we have generated context and content classifiers. For context classifiers, the OCER algorithm implemented in Iwrap toolkit developed at Xerox Research Centre Europe was used. For content classifiers, decision trees were used as the underlying learning system. Decision trees were built with the help of Borgert's classification software.

For each site, |S|=10 labeled samples have been prepared for the classifier generation and evaluation. For OCER wrapper induction, five tests were performed, each test consisted of learning the extraction rules from i=1,2,3, . . . randomly chosen samples and testing them against the remaining (10–i) samples. The average number over five experiments of samples needed to learn 98%-accurate wrappers is reported in the Table 2 below. For content classifiers, in each of five tests, a decision tree been learned from five randomly selected samples and tested against five remaining samples.

Table 2 reports the results of OCER wrapper induction and classification by content features for all providers. Abbreviations used in the table are the following: |L| is the number of classification labels, including none; N is the total number of extraction rules in an OCER wrapper, $N_1$ is the number of label-independent rules, $N_1 \leq N$; $R_m$ is the maximal number of extraction rules per label in L, $R_m \leq N$, $C_m$ is the maximal context length in extraction rules, $L_a$ is the average number of samples needed to reach 98%-accuracy; |DT| is the number of nodes in the pruned decision tree DT generated by Borgelt's package, |F| is the number of features used in DT; Err is the classification error of DT; $|L_c|$ is the number of labels with all perfect rules, $|L_c| \leq C$.

TABLE 2

Context and content classifiers for 17 providers

| Pro-vider | OCER wrapper | | | | | | | | Content Classifier | |
|---|---|---|---|---|---|---|---|---|---|---|
| | |L| | N | $N_1$ | $R_m$ | $C_m$ | $L_a$ | |DT| | |F| | Err (%) | $|L_c|$ |
| Altavista | 6 | 37 | 22 | 26 | 4 | 2.1 | 32 | 13 | 17.6 | 3 |
| Google | 6 | 27 | 12 | 11 | 4 | 2.1 | 53 | 10 | 24.7 | 2 |
| Excite | 6 | 27 | 16 | 19 | 4 | 2.0 | 17 | 7 | 9.6 | 3 |
| Yahoo | 5 | 29 | 19 | 14 | 5 | 3.8 | 40 | 10 | 16.7 | 1 |
| Metacrawler | 6 | 34 | 26 | 18 | 5 | 2.2 | 27 | 17 | 26.7 | 1 |
| Go | 5 | 19 | 14 | 14 | 3 | 1.1 | 25 | 8 | 16.9 | 2 |
| Deja | 5 | 17 | 11 | 12 | 3 | 1.1 | 33 | 10 | 14.0 | 2 |
| CNN | 6 | 35 | 28 | 21 | 4 | 2.2 | 12 | 5 | 16.1 | 2 |
| Average | 5.6 | 28.1 | 18.5 | 16.9 | 4.0 | 2.1 | 29.9 | 10.0 | 17.7 | 2.2 |
| DBLP | 7 | 12 | 7 | 4 | 3 | 1.6 | 15 | 7 | 8.8 | 5 |
| ACM Search | 7 | 18 | 12 | 9 | 4 | 1.6 | 33 | 11 | 3.7 | 4 |
| IEEE DL | 5 | 21 | 16 | 15 | 4 | 5.0 | 27 | 8 | 0.0 | 5 |
| Elsevier | 10 | 26 | 18 | 11 | 7 | 1.5 | 39 | 12 | 4.2 | 5 |
| Cora | 7 | 32 | 19 | 15 | 9 | 3.0 | 39 | 10 | 7.7 | 3 |
| Average | 7.2 | 21.8 | 14.4 | 10.6 | 5.4 | 2.5 | 30.6 | 9.5 | 4.9 | 4.6 |
| Wall Street | 7 | 32 | 22 | 23 | 8 | 2.6 | 9 | 5 | 13.0 | 3 |
| Amazon | 4 | 35 | 28 | 24 | 8 | 3.5 | 25 | 6 | 12.1 | 2 |
| Fin Times | 5 | 21 | 17 | 13 | 4 | 2.7 | 17 | 9 | 20.9 | 2 |
| Average | 5.3 | 29.3 | 22.3 | 20.0 | 6.7 | 2.9 | 17.0 | 6.7 | 15.3 | 2.7 |

Accurate OCER wrappers have been successfully regenerated for all 17 providers. Providers in the first and third groups have often advertisement-padded pages; corresponding wrappers have multiple extraction rules for the none class. Although the complexity of extracted information is higher in the second group, the third group requires more pages to learn accurate extraction rules.

As for the content classifiers were not as accurate as the context classifiers. As Table 2 shows, content classifiers give up to 26.7% classification error in the worst case (Metacrawler.com). Between three provider groups, the best results are obtained for the second group, where tokens extracted with semantic labels (not none) expose particular syntactic features and/or extracted information represents an important part of the page. Instead, for the first and third groups, extracted information represents a rather tiny part, making it difficult to distinguish between extracted and non-extracted (labeled with none) information, which results in a higher classification error.

On the other hand, although only one of 17 classifiers is perfect, each provider has certain labels with highly accurate rules (acc=1.0). These labels can be therefore correctly identified by observing their content features only. For example, DBLP wrapper has three such labels, namely number, ee and pages, they can be accurately identified by their content (see FIG. 2). As an example, the perfect rule for ee labels is the following: Length=2, UpperCase=2, Digits=0.

Recovery tests. Methods of information extraction recovery described above have been implemented in the Iwrap prototype at Xerox Research Centre Europe. Recovery methods were tested for 17 information providers. For each provider, 10 "before-change" pages have been used for learning extraction rules and content classifiers before the format change and 10 "after-change" pages have been used for testing the recovery routine. Below we report some important results.

To quantify the performance of developed recovery mechanisms, information extracted from "after-change" pages using different methods were compared. Measures of precision and recall, widely used in Information Retrieval were used. Precision is a portion of correctly labeled textual tokens in the extracted information, and recall is a portion of correctly labeled textual tokens in the correctly labeled information:

$$\text{precision} = \frac{\text{correct} \cap \text{extracted}}{\text{extracted}}, \text{recall} = \frac{\text{correct} \cap \text{extracted}}{\text{correct}}$$

First the changes which happened to all providers were classified. Among three possible format changes, of primary interest are context and structural ones. In the case of content change, the wrapper action is to notify the designer and it does not influence the recovery mechanism. So, such format changes where context or structural shift took place were selected and tested. For 17 reported format changes, context shifts occurred in all 17 cases, and structural shifts occurred in 11 cases.

In experiments, three recovery methods were tested, namely, the basic recovery, the multi-pass recovery with backward transducers and multi-pass recovery with backward wrappers and content classifiers. When using content classifiers, either perfect classification rules (thRecover=1.0) or rules with a fairly low classification errors, (thRecovery=0.95) were applied. Four tested recovery routines are denoted as follows:

Recovery 1: one-scan basic recovery (Algorithm 1).

Recovery 2: multi-scan recovery with backward transducers (Algorithms 1 and 2).

Recovery 3: multi-scan with content classifier (Algorithms 3 and 4), thRecovery=1.0.

Recovery 4: multi-scan with content classifier (Algorithms 3 and 4), thRecovery=0.95.

Figure 10:
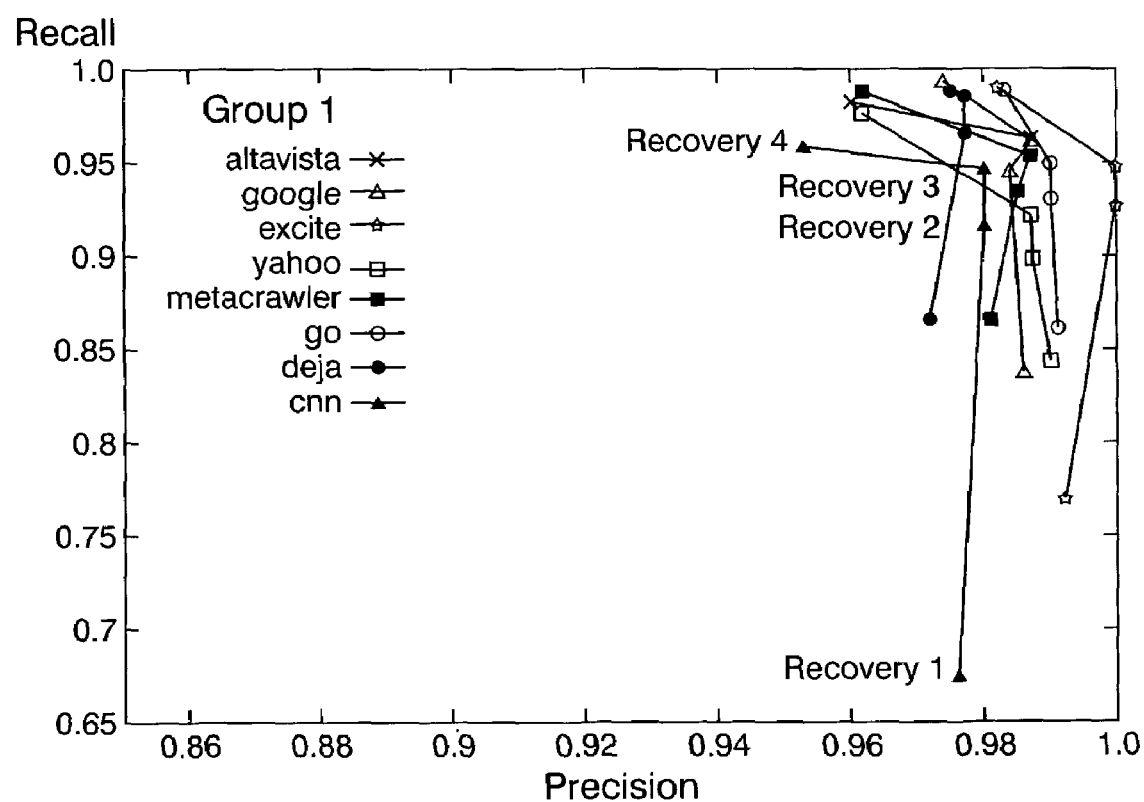
FIGS. 10–12 are graphs of recall precision for different recovery routines.
Figure 11:
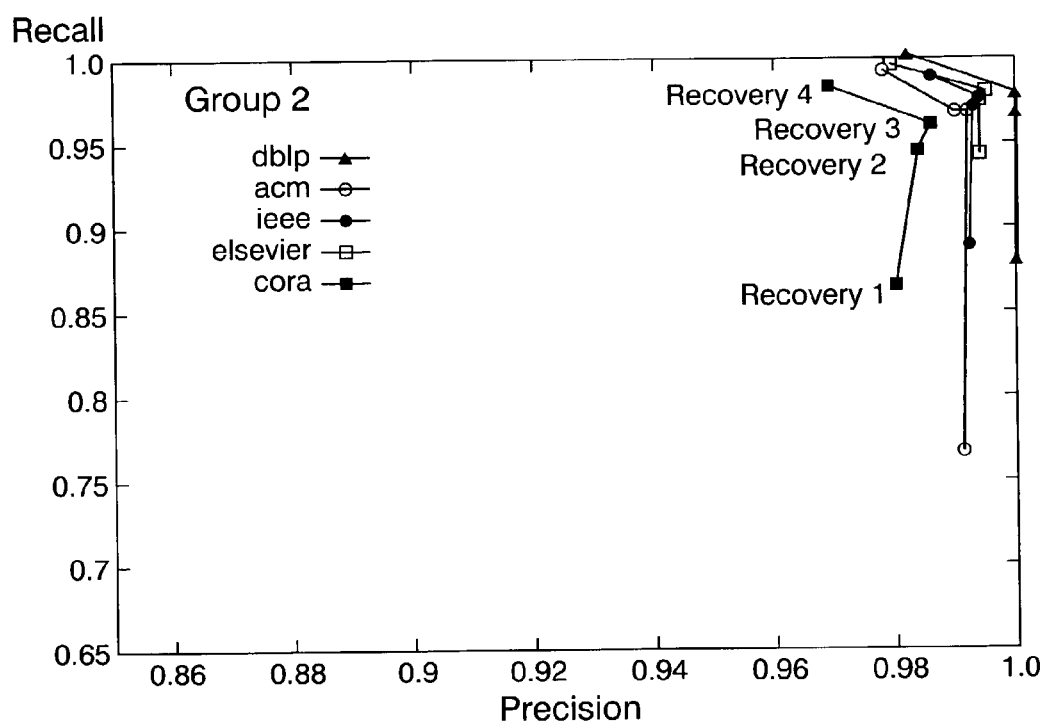
Figure 12:
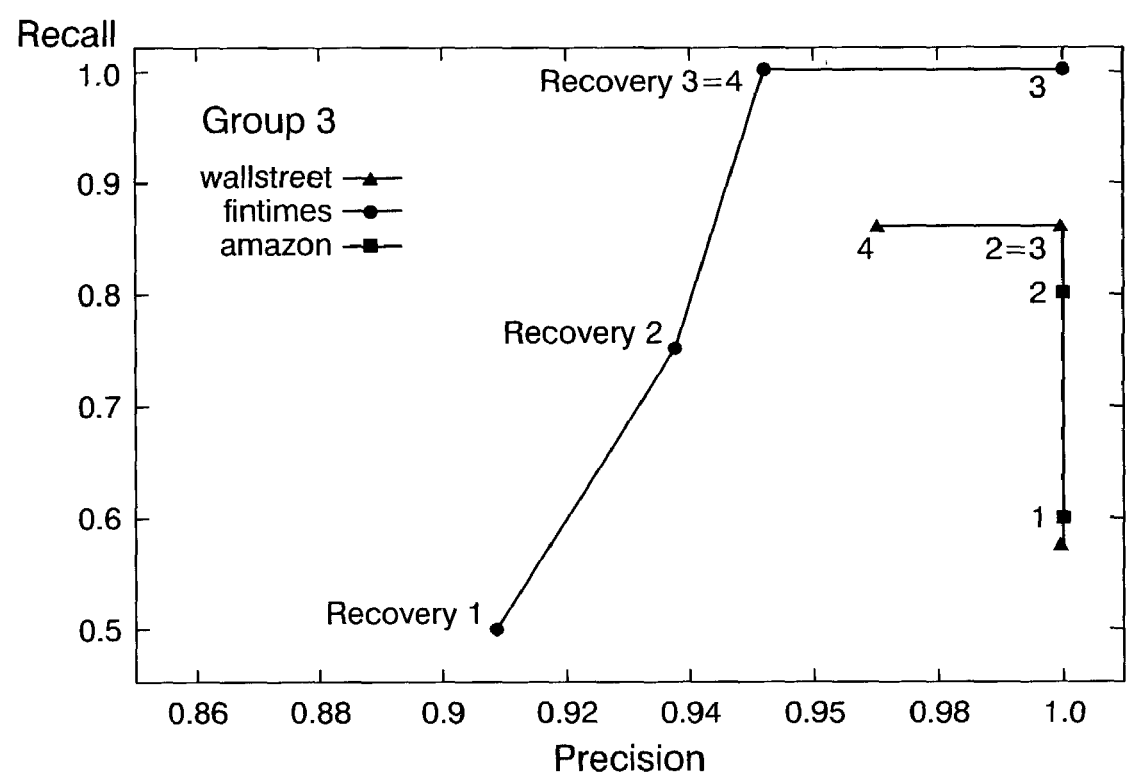

Recovery results. FIGS. 10–12 report values of recall and precision for all providers in the three groups. Axes for recall and precision are inverted for convenience of presentation only. Before changes all wrappers reported 0.98 values of recall/precision; this "before-change" status is referred by a rectangle in the upper-left corner in FIGS. 10, 11 and 12. Any format change results in the fall of precision/recall values, and the goal of all recovery routines is to return precision/recall as close as possible to the initial rectangle. For each provider, the performance of all four tested recovery methods is traced.

Recovery 1 fails to extract 5.1% to 50% of relevant information, thus showing a bottom line for the recovery performance and measuring implicitly the information extraction damage due to the format change. As the figure shows, recall suffers more that precision, as format changes disallow wrappers to classify correctly some tokens, but those tokens it does identify are relevant.

Recovery 2 that extents Recovery 1 with backward wrappers, steadily improves the recall for all providers. Recovery 3 that adds the perfect content classification rules, improves recall values further, although its gain is less important than with Recovery 2. Finally, applying some non-perfect content classification rules with thRecover=0.95 allows to further increase the recall, however by the cost of a slight decrease of the precision. In total, for 6 providers, the recovery routines allowed to re-enter the initial 0.98-accuracy box, and for 10 more providers, the recovery achieved 0.95 values for both precision and recall.

The most representative are recovery results for wrappers in the third group. In the Wall Street case, the basic recovery is able to accurately extract 4 elements of 7; recovery with the backward wrapper extracts 2 more elements. Using perfect content rules has no impact. Instead, relaxing thRecovery to 0.95 does not improve recall, but slightly decreases the precision, because of one misclassified token over 5 tests. In the Amazon case, the basic recovery extracts 2 elements of 4, and the backward wrapper and content classifier extract one more element each. However, the precision is down-valued by few misclassified tokens, as the format change confused some wrapper extraction rules. Finally, for the Financial Times wrapper, the basic recovery finds 3 elements of 5 and the backward wrapper and content classifier help find two missing ones.

Note that the recovery routines have been applied to all detected format changes, and this validates the small change assumption mentioned above. Actually, the adjective "small" was used mainly for the convenience of explanation and not to constrain the proposed recovery routines. The success or failure of the information extraction recovery is determined by a number of aspects, including the type of changes, their density or sparseness in pages, etc. If all these aspects are aggregated in one notion of "size" of a change, then it appears to be highly correlated to the chance for success: the smaller changes happening to the page, the higher probability of the successful automatic recovery.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for repairing a wrapper associated with an information source, comprising:

wherein an initial wrapper comprises an initial set of rules for extracting information and for assigning labels from a wrapper set of labels to the extracted information;

defining a classifier comprising a set of alternative rules for extracting information and for assigning labels to the extracted information;

providing a file from the information source after the information source has changed its file format;

using the classifier to extract information from the file and to assign a label to any extracted information which satisfies the label's definition; and constructing a repaired wrapper comprising those alternative rules for which corresponding labels have been assigned to information extracted by the classifier.

2. The method of claim 1, further comprising:

using the initial wrapper to extract information from the file and to assign a label from the set of wrapper labels to any extracted information which satisfies the label's definition; and constructing a repaired wrapper comprising those initial rules for which corresponding labels have been assigned to information extracted by the wrapper and those alternative rules for which corresponding labels which have been assigned to information extracted by the classifier.

3. The method of claim 2, wherein the initial set of rules comprises grammar/transducer-based rules.

4. The method of claim 1, wherein the set of alternative rules comprises content features of information extracted by the initial wrapper from files produced by the information source before it changed its file format.

5. The method of claim 1, wherein the set of alternative rules comprises context features of information extracted by the initial wrapper from files produced by the information source before it changed its file format.

6. The method of claim 1, wherein the set of alternative rules comprises structure features of information extracted by the initial wrapper from files produced by the information source before it changed its file format.

7. The method of claim 1, wherein the set of alternative rules comprises the initial set of rules applied in a direction opposite to the direction in which the initial wrapper applied them.

8. The method of claim 4, wherein content features comprise syntactic features and semantic features and wherein syntactic features comprise length of a string, number of separators between strings, and number of words in a string.

9. The method of claim 8, wherein semantic features comprise number of nouns, data strings, and numeric strings.

10. The method of claim 1, further comprising:
defining a second classifier comprising a second set of alternative rules for extracting information and for assigning labels to the extracted information;
using the second classifier to extract information from the file and to assign a label to any extracted information which satisfies the label's definition; and
constructing a repaired wrapper comprising those alternative rules from the set of alternative rules for which corresponding labels have been assigned to information extracted by the classifier and those alternative rules from the second set of alternative rules for which corresponding labels have been assigned to information extracted by the second classifier.

11. The method of claim 10, wherein the set of alternative rules comprises content features of information extracted by the initial wrapper from files produced by the information source before it changed its file format; and wherein the second set of alternative rules comprises structure features of information extracted by the initial wrapper from files produced by the information source before it changed its file format.

* * * * *